US008849795B2

(12) United States Patent
Brown et al.

(10) Patent No.: US 8,849,795 B2
(45) Date of Patent: *Sep. 30, 2014

(54) OPTIMIZING THE EXECUTION OF A QUERY IN A MULTI-DATABASE SYSTEM

(75) Inventors: Douglas Brown, Rancho Santa Fe, CA (US); John Mark Morris, San Diego, CA (US)

(73) Assignee: Teradata US, Inc., Dayton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/271,867

(22) Filed: Oct. 12, 2011

(65) Prior Publication Data

US 2012/0265751 A1    Oct. 18, 2012

Related U.S. Application Data

(63) Continuation of application No. 12/344,794, filed on Dec. 29, 2008, now Pat. No. 8,108,382.

(51) Int. Cl.
*G06F 17/30* (2006.01)

(52) U.S. Cl.
CPC .... *G06F 17/30463* (2013.01); *G06F 17/30584* (2013.01); *G06F 17/30545* (2013.01)
USPC ............................ 707/718; 707/715; 707/719

(58) Field of Classification Search
USPC .................................. 707/713, 715, 718, 719
See application file for complete search history.

(56) References Cited

U.S. PATENT DOCUMENTS

| 5,724,575 | A | * | 3/1998 | Hoover et al. ................ 709/205 |
| 5,832,497 | A | * | 11/1998 | Taylor .................... 707/999.003 |
| 7,194,473 | B1 | * | 3/2007 | Hichwa et al. ......... 707/999.102 |
| 7,234,112 | B1 | * | 6/2007 | Brown et al. .................. 715/713 |
| 8,341,178 | B2 | * | 12/2012 | Belknap et al. ............... 707/769 |
| 2004/0153454 | A1 | * | 8/2004 | Aldrich et al. .................. 707/10 |
| 2006/0140466 | A1 | * | 6/2006 | Seshimo et al. .............. 382/133 |
| 2007/0083490 | A1 | * | 4/2007 | Au et al. ............................ 707/2 |
| 2007/0270658 | A1 | * | 11/2007 | Mitchell ...................... 600/300 |
| 2008/0306904 | A1 | * | 12/2008 | Fukuda et al. .................... 707/2 |
| 2009/0077017 | A1 | * | 3/2009 | Belknap et al. .................... 707/2 |
| 2009/0094192 | A1 | * | 4/2009 | Bestgen et al. .................... 707/2 |
| 2009/0164505 | A1 | * | 6/2009 | Tudose ........................ 707/102 |
| 2009/0282272 | A1 | * | 11/2009 | Bestgen et al. ............... 713/320 |
| 2012/0166402 | A1 | * | 6/2012 | Pederson et al. ............. 707/692 |
| 2013/0132405 | A1 | * | 5/2013 | Bestgen et al. ............... 707/748 |

* cited by examiner

*Primary Examiner* — Phong Nguyen
(74) *Attorney, Agent, or Firm* — Howard Speight PLLC; Ramin Mahboubian

(57) ABSTRACT

Optimizing the execution of a query in a multi-database system includes identifying a region within a table, the table being referenced in the query. The region is stored on data-storage devices on first and second system databases in the multi-database system. A first access plan for the query is developed, the first access plan comprising accessing the version of the region stored on the first system database. A second access plan for the query is developed, the second access plan comprising accessing the version of the region stored on the second system database. A selection is made between the first access plan and the second access plan to execute the query. The query is executed using the selected access plan to produce a result.

20 Claims, 6 Drawing Sheets

OPTIMIZING THE EXECUTION OF A QUERY IN A MULTI-DATABASE SYSTEM

CROSS REFERENCE TO RELATED APPLICATIONS

This is a Continuation of the U.S. patent application Ser. No. 12/344,794 filed Dec. 29, 2008 now U.S. Pat. No. 8,108,382 entitled: "OPTIMIZING THE EXECUTION OF A QUERY IN A MULTI-DATABASE SYSTEM," by Douglas P. Brown et al., which is hereby incorporated by reference herein in its entirety and for all purposes.

BACKGROUND

Query execution optimization is used to make the best use of valuable database system resources. Query execution optimization is particularly challenging in a multi-database system.

SUMMARY

In general, in one aspect, the invention features a method for optimizing the execution of a query in a multi-database system. The multi-database system includes a plurality of system databases. The method includes identifying a region within a table, the table being referenced in the query. The method further includes storing the region on a data-storage device on a first of the system databases in the multi-database system. The method further includes storing the region on a data-storage device on a second of the system databases in the multi-database system, the second system database being a different system database than the first system database. The method further includes developing a first access plan for the query, the first access plan comprising accessing the version of the region stored on the first system database. The method further includes developing a second access plan for the query, the second access plan comprising accessing the version of the region stored on the second system database. The method further includes selecting between the first access plan and the second access plan to execute the query. The method further includes executing the query using the selected access plan to produce a result. The method further includes storing the result.

Implementations of the invention may include one or more of the following. The table may have a plurality of rows and a plurality of columns and the region within the table may include less than all of any column in the table. The table may have a plurality of rows and a plurality of columns and the region within the table may include less than all of any row in the table and less than all of any column in the table. The method may further include indexing the first version of the region using a first indexing scheme. The method may further include indexing the second version of the region using a second indexing scheme. Selecting between the first access plan and the second access plan may include considering the first indexing scheme and the second indexing scheme. Selecting between the first access plan and the second access plan may include selecting the first access plan. Executing the query using the selected access plan may include beginning execution of the query on the first system database using the first access plan. The method may further include determining that the first system database has failed prior to completion of execution of the query, and in response executing the query on the second system database using the second access plan. Selecting between the first access plan and the second access plan may include selecting the first access plan. Executing the query using the selected access plan may include executing the query on the first system database using the first access plan and spooling the first version of the region to a database system other than the first database system during execution of the query. The method may further include not storing the complete table on any database in the multi-database system.

In general, in another aspect, the invention features a multi-database system comprising a plurality of system databases. The system includes at least one system database. The at least one system database includes one or more nodes. The at least one system database includes a plurality of CPUs, each of the one or more nodes providing access to one or more CPUs. The at least one system database includes a plurality of virtual processes, each of the one or more CPUs providing access to one or more virtual processes. Each virtual process is configured to manage data, including rows from the set of database table rows, stored in one of a plurality of data-storage facilities. The at least one system database includes a process configured to optimize the execution of a query in which a region within a table referenced by the query has been stored on a first of the system databases in the multi-database system and on a data-storage device on a second of the system databases in the multi-database system, the second system database being a different system database than the first system database. The process develops a first access plan for the query. The first access plan includes accessing the version of the region stored on the first system database. The process further develops a second access plan for the query. The second access plan includes accessing the version of the region stored on the second system database. The process selects between the first access plan and the second access plan to execute the query. The process executes the query using the selected access plan to produce a result. The process stores the result.

In general, in another aspect, the invention features a computer program, stored in a computer-readable tangible medium, for optimizing the execution of a query. The program includes executable instructions that cause a computer to identify a region within a table, the table being referenced in the query. The program includes executable instructions that cause a computer to store the region on a data-storage device on a first of the system databases in the multi-database system. The program includes executable instructions that cause a computer to store the region on a data-storage device on a second of the system databases in the multi-database system, the second system database being a different system database than the first system database. The program includes executable instructions that cause a computer to develop a first access plan for the query. The first access plan includes accessing the version of the region stored on the first system database. The program includes executable instructions that cause a computer to develop a second access plan for the query. The second access plan includes accessing the version of the region stored on the second system database. The program includes executable instructions that cause a computer to select between the first access plan and the second access plan to execute the query. The program includes executable instructions that cause a computer to execute the query using the selected access plan to produce a result. The program includes executable instructions that cause a computer to store the result.

DETAILED DESCRIPTION

Figure 1:
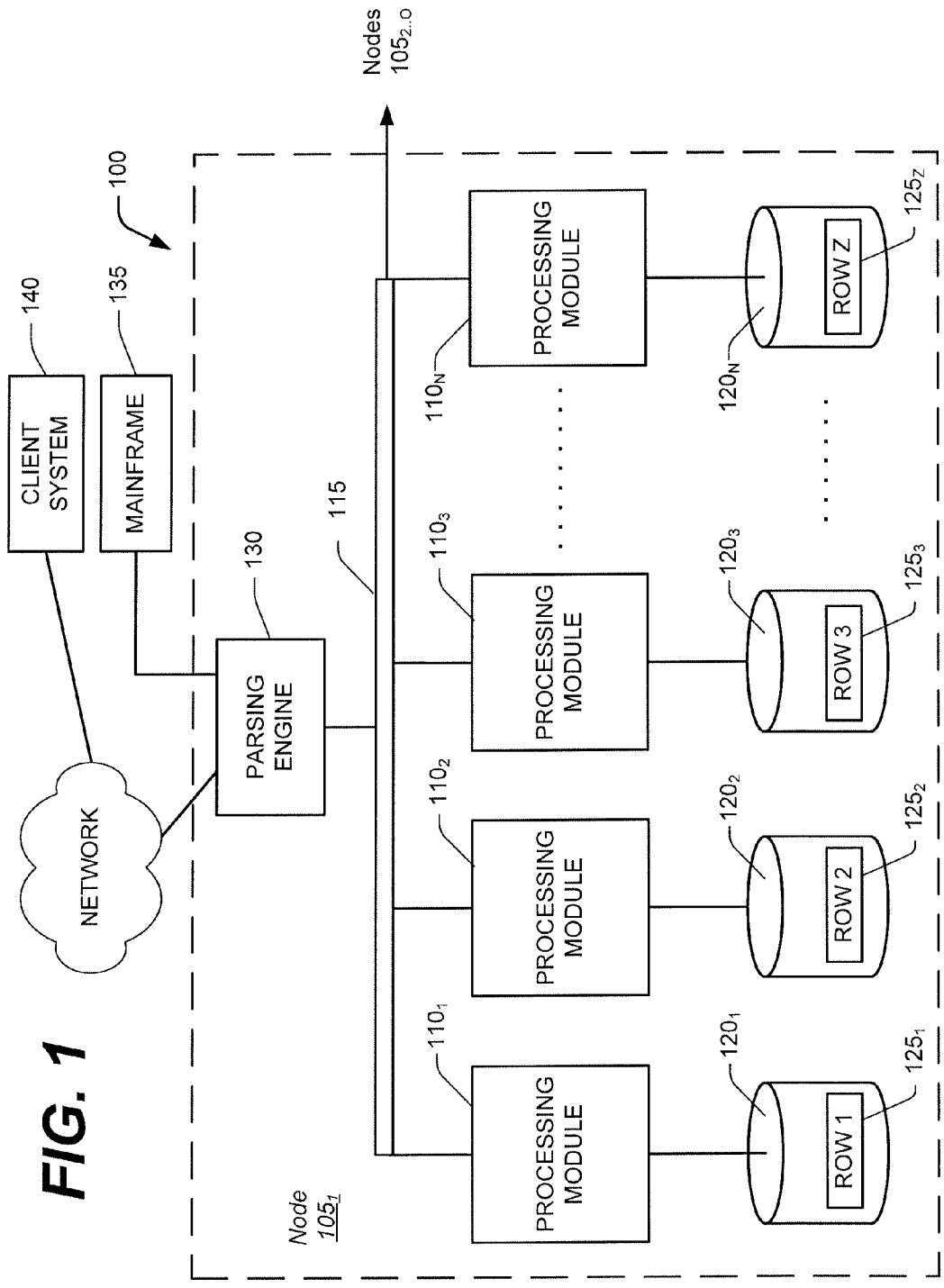
FIG. 1 is a block diagram of a node of a database system.

The database row storage technique disclosed herein has particular application, but is not limited, to large databases that might contain many millions or billions of records managed by a database system ("DBS") 100, such as a Teradata Active Data Warehousing System available from the assignee hereof. FIG. 1 shows a sample architecture for one node $105_1$ of the DBS 100. The DBS node $105_1$ includes one or more processing modules $110_{1 \ldots N}$, connected by a network 115, that manage the storage and retrieval of data in data-storage facilities $120_{1 \ldots N}$. Each of the processing modules $110_{1 \ldots N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1 \ldots N}$ manages a portion of a database that is stored in a corresponding one of the data-storage facilities $120_{1 \ldots N}$. Each of the data-storage facilities $120_{1 \ldots N}$ includes one or more disk drives. The DBS may include multiple nodes $105_{2 \ldots N}$ in addition to the illustrated node $105_1$, connected by extending the network 115.

The system stores data in one or more tables in the data-storage facilities $120_{1 \ldots N}$. The rows $125_{1 \ldots Z}$ of the tables are stored across multiple data-storage facilities $120_{1 \ldots N}$ to ensure that the system workload is distributed evenly across the processing modules $110_{1 \ldots N}$. A parsing engine 130 organizes the storage of data and the distribution of table rows $125_{1 \ldots Z}$ among the processing modules $110_{1 \ldots N}$. The parsing engine 130 also coordinates the retrieval of data from the data-storage facilities $120_{1 \ldots N}$ in response to queries received from a user at a mainframe 135 or a client computer 140. The DBS 100 usually receives queries and commands to build tables in a standard format, such as SQL.

In one implementation, the rows $125_{1 \ldots Z}$ are distributed across the data-storage facilities $120_{1 \ldots N}$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities $120_{1 \ldots N}$ and associated processing modules $110_{1 \ldots N}$ by a hash bucket map. The characteristics of the columns chosen for the primary index determine how evenly the rows are distributed.

In addition to the physical division of storage among the storage facilities illustrated in FIG. 1, each storage facility is also logically organized. One implementation divides the storage facilities into logical blocks of storage space. Other implementations can divide the available storage space into different units of storage. The logical units of storage can ignore or match the physical divisions of the storage facilities.

Figure 2:
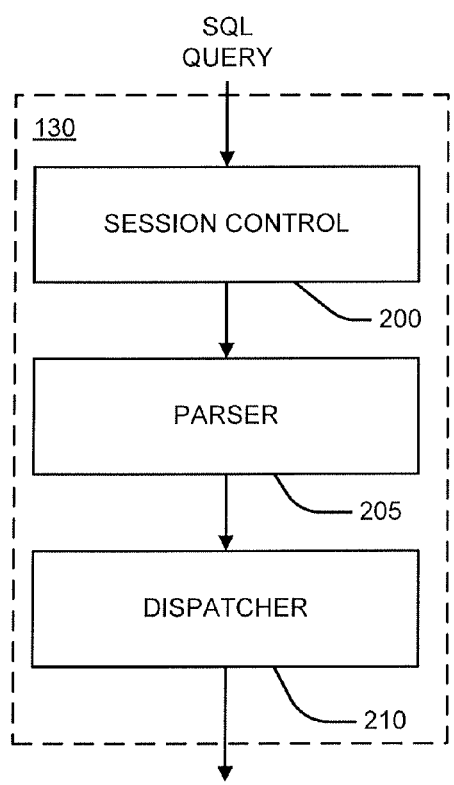
FIG. 2 is a block diagram of a parsing engine.

In one example system, the parsing engine 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access.

Figure 3:
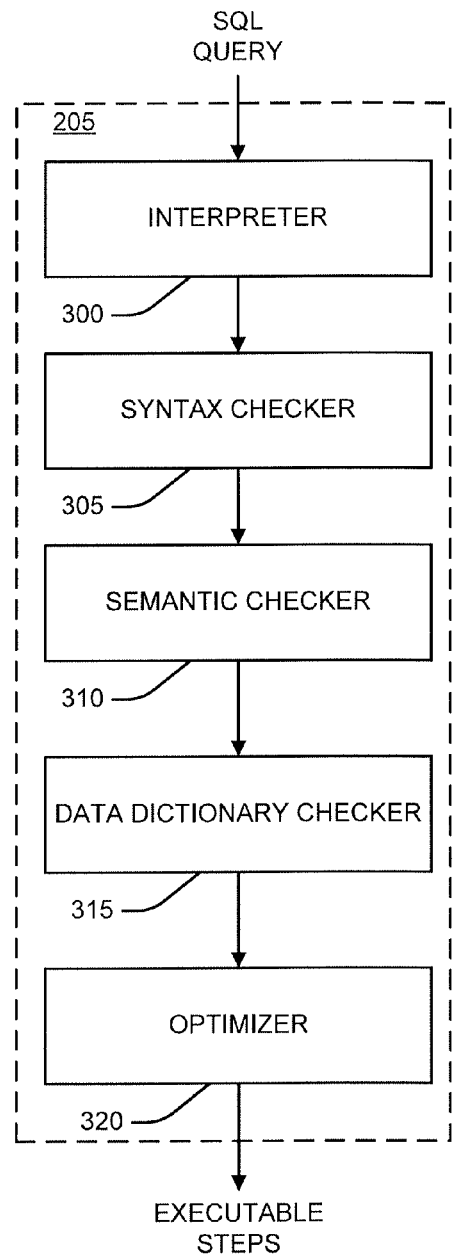
FIG. 3 is a flowchart of a parser.

Once the session control 200 allows a session to begin, a user may submit a SQL query, which is routed to the parser 205. As illustrated in FIG. 3, the parser 205 interprets the SQL query (block 300), checks it for proper SQL syntax (block 305), evaluates it semantically (block 310), and consults a data dictionary to ensure that all of the objects specified in the SQL query actually exist and that the user has the authority to perform the request (block 315). Finally, the parser 205 runs an optimizer (block 320), which develops the least expensive plan to perform the request and produces executable steps to execute the plan. A dispatcher 210 issues commands to the processing modules $110_{1 \ldots N}$ to implement the executable steps.

Figure 4:
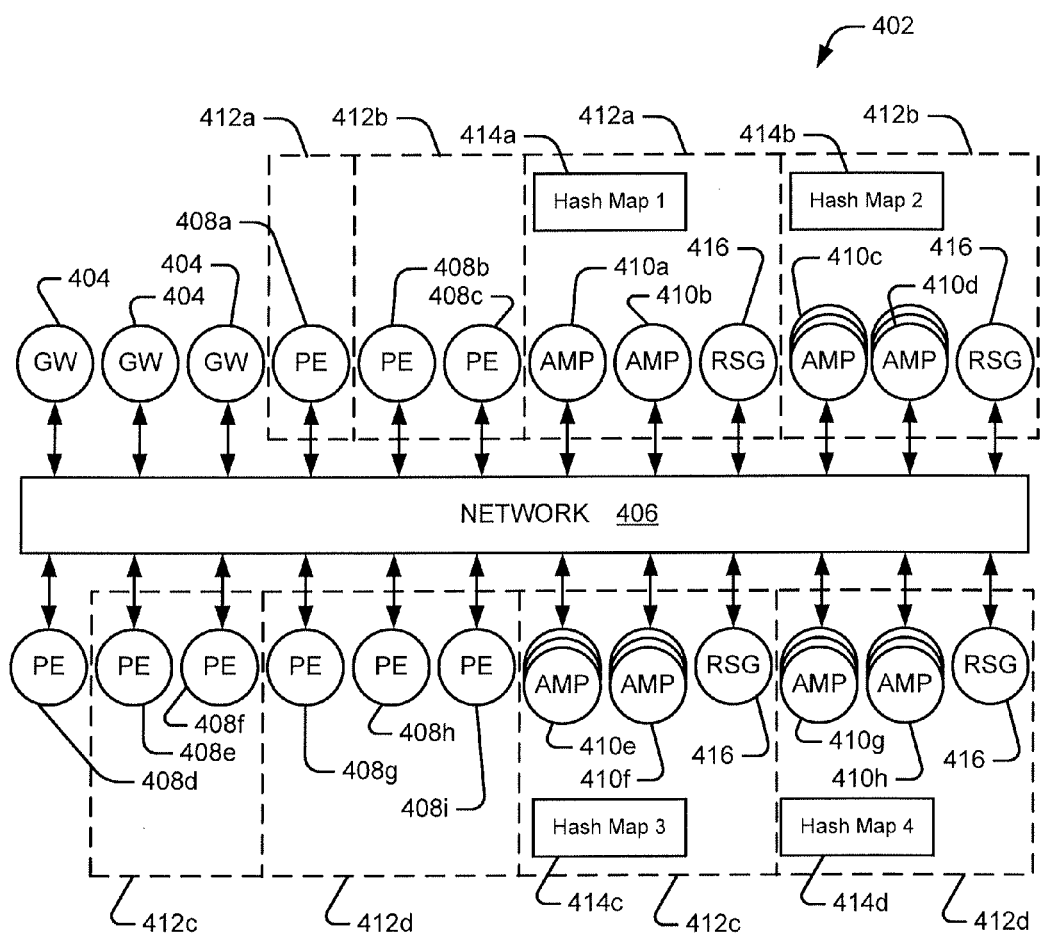
FIG. 4 is a block diagram of a multi-database system.

FIG. 4 illustrates one embodiment of a multi-database system 402 having a plurality of system databases of the type illustrated in FIG. 1. In one embodiment, one or more gateways ("GW") 404 provide an interface from a local area network ("LAN") or other communications network, such as the Internet or a wireless network, to a network 406 that interconnects the components of the multi-database system 402. In one embodiment, the gateways 404 receive messages from a LAN and convert them to a message format used on the network 406. In one embodiment, this entails encapsulating messages received via the LAN in a wrapper appropriate for the network 406.

In one embodiment, the virtual parsing engines ("PE") 408a-i perform the functions of the parsing engine 130 described above. In one embodiment, however, the virtual parsing engines 408a-i are not fixedly assigned to a set of processing modules 110. Instead, the mapping between virtual parsing engines 408a-i and processing modules 110 is variable depending on the current needs of the system. In one embodiment, one of the virtual parsing engines, 408a, serves as a virtual regulator, providing the functions described in co-pending U.S. patent application Ser. No. 11/891,919, entitled "Dynamic Query Optimization Between Systems Based On System Conditions," incorporated by reference.

In one embodiment, Access Module Processors ("AMPs") 410a-h, which are generally equivalent to the processing modules $110_{1 \ldots N}$ shown in FIG. 1, are grouped as shown by the dashed boxes 412a-d in FIG. 4. In one embodiment, each group 412a-d is a DBS 100 (or system database). In one embodiment, each system database 412a-d is assigned one or more virtual PEs 408a-i. In the example shown in FIG. 4, virtual PE 408a is assigned to system database 412a as indicated by the dashed box enclosing that item. Further, virtual PEs 408b and 408c are assigned to system database 412b, virtual PEs 408e and 408f are assigned to system database 412c, and virtual PEs 408g, 408h, and 408i are assigned to system database 412d. Virtual PE 408d is not assigned to any system database and is being held "in reserve." In one embodiment, hash maps 414a-d identify which system database and AMP 410a-h is to receive a message directed to one of the system databases 412a-d. For example, if a message is directed to system database 412a, the virtual PE 408a that is assigned to system database 412a will use hash map 414a to determine if the message is to be delivered to AMP 410a or AMP 410b. Some of the AMPs in FIG. 4, such as AMP 410c, are represented as overlapping circles, indicating that AMP 410c is a plurality of AMPs. Generally, in one embodiment, the groups 412a-d can contain any number of AMPs. Each system database 412a-d includes a replication service group ("RSG") 416 that coordinates applying changes made to data in one system database to the same data replicated in another system database.

In one embodiment, in such a multi-database system 402, storage of database objects, such as tables, can be flexible. Consider, for example, the table 502 shown in FIG. 5. It is shown as a rectangular array of rows and columns, which is one traditional representation of a table, but should not be seen as limiting. Traditionally, the table 502 would be stored entirely in a single system database 412a-d. Within a system database, say system database 412b, the table might be stored entirely on a single data-storage facility, such as data storage facilities $125_1 \ldots _N$ shown on FIG. 1, or the data might be partitioned by row or column among two or more data storage facilities.

Figure 5:
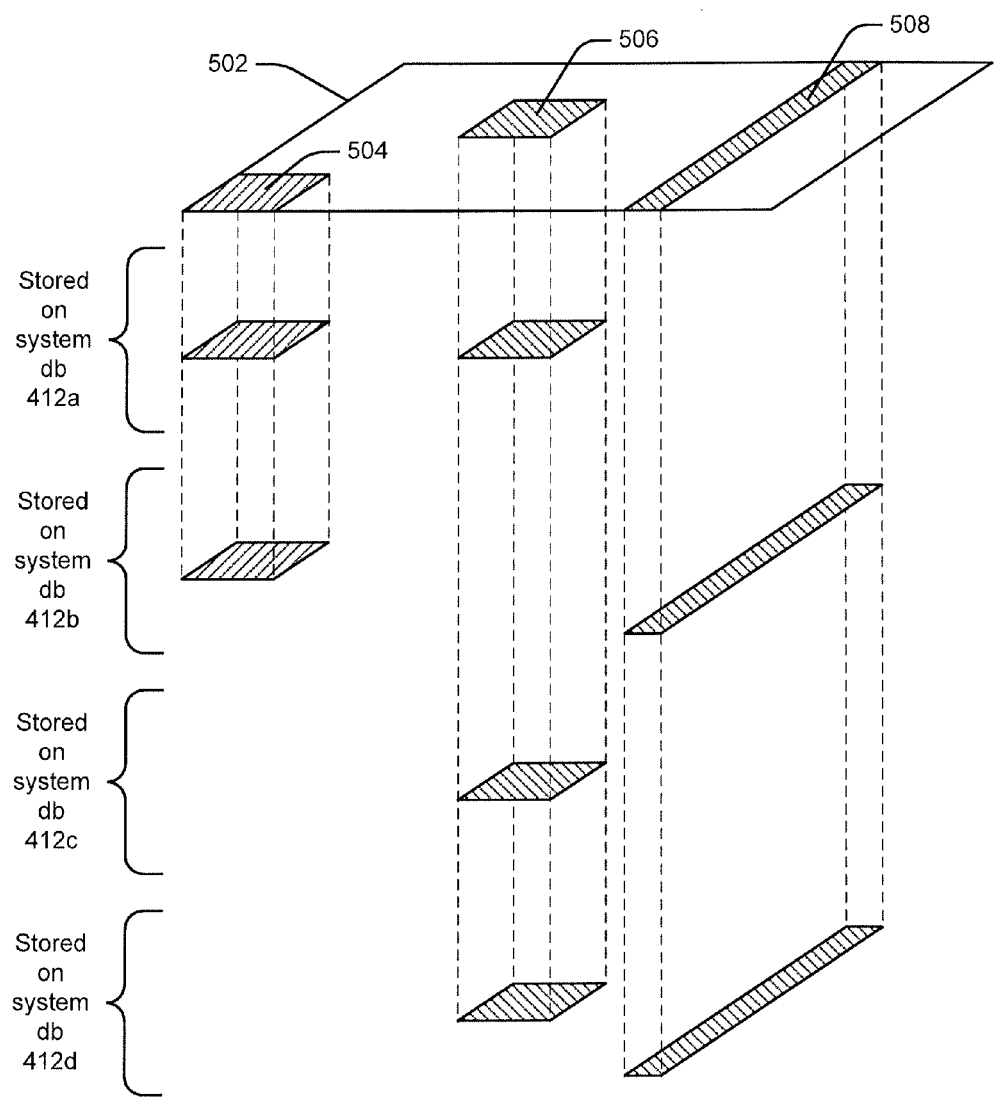
FIG. 5 illustrates the storage of a table in a multi-database system.

In multi-database system 402, the storage of table 502 can be divided among two or more of the system databases 412a-d, as shown in FIG. 5. For example, a first region 504 of the table 502 may be stored on system database 412a and a second region 506 may be stored on system database 412c. Note that regions 504 and 506 are not entire rows or entire columns. A third region 508 is a set of rows (or columns) and may be stored on system database 412d.

In addition, table regions may be stored on more than one database for enhanced performance or data protection. For example, in the example shown in FIG. 5, region 504 is stored on system database 412a and system database 412b, region 506 is stored on system database 412a, system database 412b, and system database 412c, and region 508 is stored on system database 412b and system database 412d.

In one embodiment, table 502 is not stored on a single system database 412a-d but is spread among a plurality of system databases 412a-d. In one embodiment, one copy of table 502 is stored on a single system database and at least some regions of a copy of the table 502 are spread among a plurality of system databases 412a-d. In one embodiment, all regions of table 502 are stored on more than one system database 412a-d. In one embodiment, at least some regions of table 502 are stored on more than one system database 412a-d.

Figure 6:
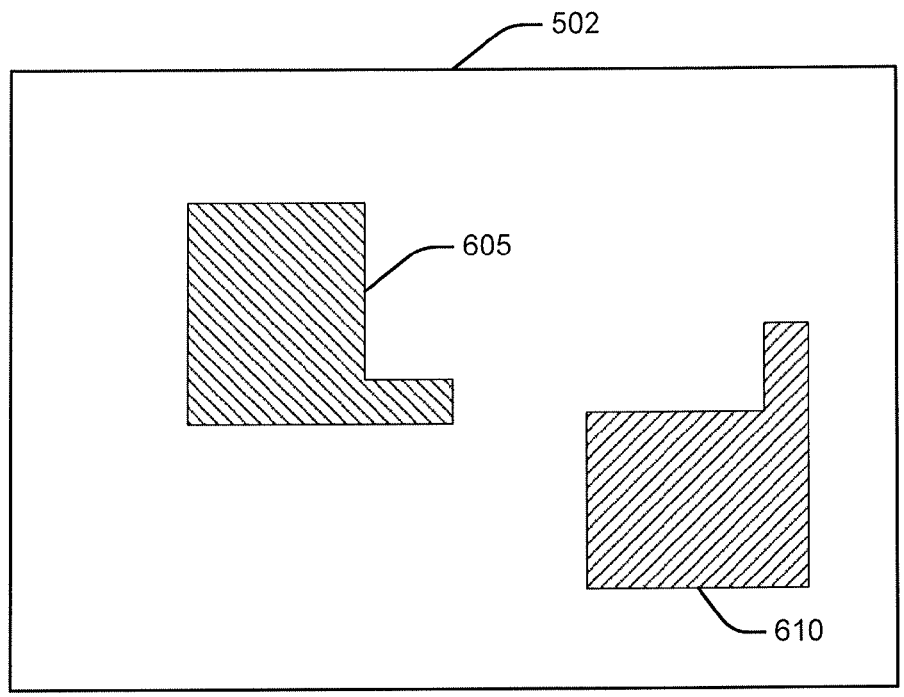
FIG. 6 illustrates non-rectangular regions.
Figure 7:
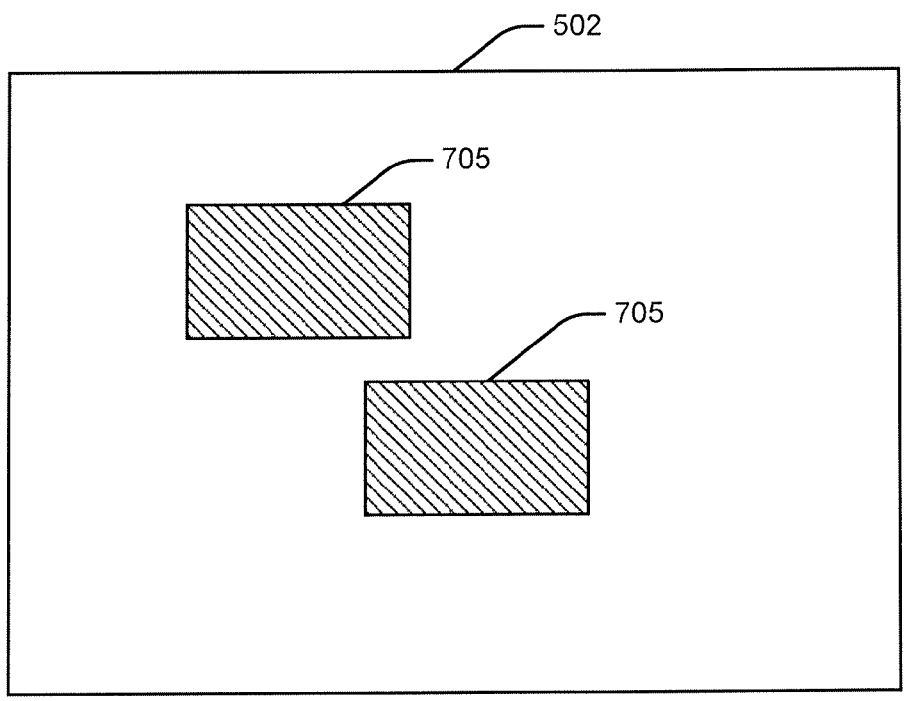
FIG. 7 illustrates non-contiguous regions.

FIG. 5 shows the regions as rectangles, which is intended to indicate that the regions are common elements of contiguous rows or columns. That is, region 504 contains the same row elements from a set of contiguous columns. In one embodiment, regions are not limited in that fashion. For example, in FIG. 6, regions 605 and 610 are not rectangular, which means that they contain more elements from one set of rows (or columns) than from the other rows (or columns) in the table 502. Further, a region, such as region 705 in FIG. 7, may contain non-contiguous parts. Storage of such non-rectangular and/or non-contiguous regions may be accomplished in system databases that are conventionally rectangular in nature by filling the open spots left by the shape of the region with NULLS.

In addition, in one embodiment, regions of table 502 may be directed to data-storage facilities that are cost or performance appropriate for that region. For example, rarely accessed history regions may be assigned to an older, slower system. Static, non-updateable multi-media objects may be assigned to a system database with optical WORM devices. An example syntax that might be used to define such storage is:

CREATE TABLE tablename on SYSTEM x in STORAGE y;

In one embodiment, the multi-database system provides a global composite view of the table 502 so that, from the point of view of the user or an application, the division of the table 502 among the system databases 412a-d is not apparent. The global composite view is useful in optimization of the execution of a query by the multi-database system 402.

In one embodiment, the global composite view of a table can be used in any SQL statement where a relation (e.g., table 502) is acceptable. As is conventional, when a view is supplied to an SQL statement, the system determines the method to access the data in the view and that may include selection, projections, and joins. The same considerations come into play when the global composite view of a table is used.

There are additional considerations when using a global composite view in optimization. Relation data elements may have multiple access paths or physical instances. For example, the relation may be stored on two system databases or in two data-storage facilities on the same system database. In one embodiment, each location where the relation is stored equates to another potential access path for the relation that must be considered during optimization. In addition, as shown in FIG. 5, different regions of a single relation may be stored in different system databases, which, in one embodiment, increases the number of access paths available to the optimizer. Further, the optimizer may consider whether some of the system databases or data-storage facilities where the relation or regions from the relation are off line or out of service, meaning that such system databases and data-storage facilities must be eliminated from consideration during the optimization process. Still further, one system database may index a region using one technique and another system database may index the same region using a different technique. In one embodiment, the optimizer considers the techniques that each system database uses to index a relation or a region from a relation during optimization. In addition, in one embodiment, the multi-database system can spool relations or regions from relations to system databases during query execution. In one embodiment, the optimizer considers the availability and suitability of spooling on the system databases during optimization.

Figure 8:
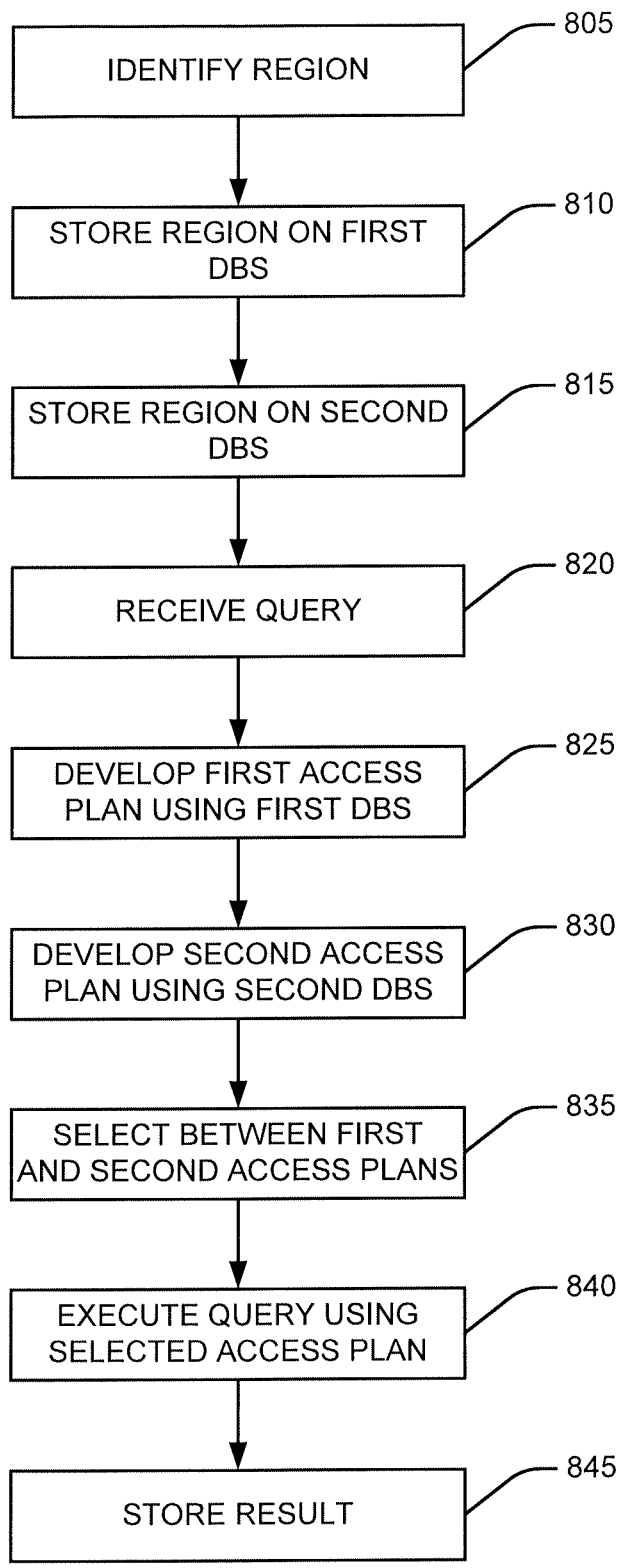
FIG. 8 is a flow chart of a system for optimizing the execution of a query in a multi-database system.

In use, in one embodiment illustrated in FIG. 8, the multi-database system 402 identifies a region within a relation (block 805), such as regions 504, 506 and 508 within table 502 in FIG. 5. In one embodiment, the multi-database system 402 stores the region on a data-storage device on a first system database, i.e., one of 412a-d (block 810). The first system database may index the region using a first indexing scheme. In one embodiment, the multi-database system 402 stores the region on a data-storage device on a second system database, i.e., one of 412a-d, different from the first system database (block 815). The second system database may index the region using a second indexing scheme. In one embodiment, the multi-database system 402 receives a query (block 820). In one embodiment, the multi-database system 402 develops a first access plan for the query involving accessing the version of the region stored on the first system database (block 825). In one embodiment, the multi-database system 402 develops a second access plan for the query involving accessing the version of the region stored on the second database (block 830). In one embodiment, the multi-database system 402 selects between the first access plan and the second access plan to execute the query (block 835). In one embodiment, the selection is based on the relative cost of the two access plans. In one embodiment, the cost of an access plan is related to the factors described above, i.e., the indexing scheme, the availability of the two system databases, the performance of the two databases, etc.

While on a single system, plan costs are comparable because they are in the same units (e.g., the resource utilization of CPU and I/O having been translated in to execution time), it is more challenging on a multi-database system 402. In one embodiment, system plan costs are calculated in terms of execution time. In one embodiment, system plan costs are calculated in terms of a function of resource allocation, f(cpu,io,msg), where f(cpu,io,msg) is a function that gives a figure of merit regarding resource utilization. As one simple example, f(cpu,io,msg) the sum of the percentage of system database's CPU time, I/O capacity, and messaging capacity expected to be used to carry out the access plan divided by three. In another simple example, f(cpu,io,msg) is a weighted average of the percentage of system database's CPU time, I/O capacity, and messaging capacity expected to be used to carry out the access plan, with the weights being, in one embodiment, the same across all system databases, and in another embodiment, different from one system database to another depending on adjustments made by the DBAs for those different systems. Other examples of f(cpu,io,msg) are possible.

Further, in one embodiment, adjustments to f(cpu,io,msg) are made at a multi-database system level. For example, if there are two system databases (i.e., two of system databases 412a-d), one having a single node and the other having 10 nodes, and they both execute a query in the same execution time, but the single node database system uses far less resources in doing so, it would made sense to pick the single node database system. In a more difficult case, however, suppose the single node database system has an execution time twice as long as the 10 node database system but uses half the resources. In that case, in one embodiment, the multi-database system considers the opportunity cost of engaging so much of the single node database system's resources as part of comparing the costs of the access plans. In one embodiment, the multi-database system 402 considers any requirement that has been placed on the query, in terms of response time or some other quality parameter or service level goal, in selecting between the available access plans.

In one embodiment, the multi-database system 402 executes the query using the selected access plan (block 840). In one embodiment, the multi-database system 402 stores the result of executing the query (block 845).

In one embodiment, the system database chosen to execute the query may fail before the query. In one embodiment, the multi-database system discards the chosen access plan and selects the access plan associated with the system database that has not failed. In one embodiment, the multi-database system simultaneously executes the query using the chosen access plan and a backup access plan. In that case, the system database running the backup access plan can take over if the system database running the chosen access plan fails or does not provide expected performance.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method, implemented at least partly by one or more processors, for optimizing the execution of a query in a multi-database system comprising a plurality of system databases, the method comprising:
    identifying, by the one or more processors, a region within a table, the table being referenced in the query;
    developing a first access plan for the query, the first access plan comprising accessing a version of the region within the table stored on a first one of the system databases in a first arrangement;
    developing a second access plan for the query, the second access plan comprising accessing another version of the same region with the same table stored on a second one of the system databases in a second arrangement different than the first arrangement;
    selecting between the first access plan and the second access plan to execute the query at least based on selecting between the first and second arrangements of the same region within the same table, in response to the query; and
    executing the selected access plan on the selected system database associated with the selected arrangement of the region within the table being referenced in the query, in response to the query.

2. The method of claim 1, wherein the region includes at least one partition.

3. The method of claim 1, wherein the region includes at least one virtual partition.

4. The method of claim 1, wherein the method further comprises:
    indexing the first version of the region using a first indexing scheme;
    indexing the second version of the region using a second indexing scheme;
    selecting between the first access plan and the second access plan to execute the query at least partly by considering the first indexing scheme and the second indexing scheme.

5. The method of claim 4, wherein at least the first indexing is a non-primary indexing scheme.

6. The method of claim 4, wherein at least the first indexing is based on a join index.

7. The method of claim 4, wherein at least the first indexing is based on a secondary index.

8. The method of claim 4, wherein at least the first indexing is based on a non-unique primary index.

9. A multi-database system comprising a plurality of system databases, the system comprising:
    at least one system database comprising:
        one or more nodes;
        a plurality of CPUs, each of the one or more nodes providing access to one or more CPUs;
        a plurality of virtual processes, each of the one or more CPUs providing access to one or more virtual processes;
        each virtual process configured to manage data, including rows from the set of database b
        a process configured to optimize the execution of a query in which a region within a table referenced by the query has been stored on a first of the system databases in the multi-database system and on a data-storage device on a second of the system databases in the multi-database system, the second system database being a different system database than the first system database, the process optimizing the execution of the query by:

developing a first access plan for the query, the first access plan comprising accessing a first version of the region within the table stored on the first system database in a first arrangement;

developing a second access plan for the query, the second access plan comprising accessing a second version of the same region within the same table stored on the second system database in a second arrangement different than the first arrangement;

selecting between the first access plan and the second access plan to execute the query at least partly based on selecting between the first and second arrangements of the same region within the same table in response to the query;

executing the query using the selected access plan to produce a result; and storing the result.

10. The system of claim 9, wherein the process further comprises:

indexing the first version of the region using a first indexing scheme;

indexing the second version of the region using a second indexing scheme; and wherein selecting between the first access plan and the second access plan comprises considering the first indexing scheme and the second indexing scheme.

11. The system of claim 9, wherein:

selecting between the first access plan and the second access plan comprises selecting the first access plan;

executing the query using the selected access plan comprises beginning execution of the query on the first system database using the first access plan; and wherein the process further comprises:

determining that the first system database has failed prior to completion of execution of the query, and in response:

executing the query on the second system database using the second access plan.

12. The system of claim 9, wherein:

selecting between the first access plan and the second access plan comprises selecting the first access plan;

executing the query using the selected access plan comprises executing the query on the first system database using the first access plan; and spooling the first version of the region to a database system other than the first database system during execution of the query.

13. A non-transitory computer-readable medium storing at least executable instructions for optimizing the execution of a query, wherein the executable instructions when executed cause a computer to:

identify a region within a table, the table being referenced in the query;

develop a first access plan for the query, the first access plan comprising accessing a version of the region within the table stored on the first one of the system databases in a first arrangement;

develop a second access plan for the query, the second access plan comprising accessing another version of the same region within the same table stored on a second one of the system databases in a second arrangement different than the first;

select between the first access plan and the second access plan to execute the query at least partly based on selecting between the first and second arrangements of the same region within the same table, in response to the query; and execute the query using the selected access plan to produce a result, in response to the query.

14. A computing system that includes one or more processors operable to:

develop a first access plan for a database query requiring access to at least one partition of a table in a multisystem database, the first access plan comprising accessing a first version of the at least one partition of the table which is stored on the first database system of a multisystem database in a first arrangement;

develop a second access plan for the database query, the second access plan comprising accessing a second version of the same at least one partition of the same table which is stored on a second database system of the multisystem database instead of accessing the first version of the partition of the table stored on the first database system, wherein the second version of the at least one partition of the table is different than the version of the at least one partition of the table in a second arrangement different than the first arrangement;

select between the first access plan and the second access plan in response to the database query at least partly based on selection between the first and second arrangements of the same at least one partition of the same table, in response to the database query; and execute the query using the selected access plan to produce a result, in response to the database query.

15. The computing system of claim 14, wherein the partition includes at least one virtual partition.

16. The computing system of claim 14, wherein the one or more processors are further operable to:

index the first version of the region using a first indexing scheme;

index the second version of the region using a second indexing scheme; and select between the first access plan and the second access plan to execute the query at least partly by considering the first indexing scheme and the second indexing scheme.

17. The computing system of claim 16, wherein at least the first indexing is a non-primary indexing scheme.

18. The computing system of claim 16, wherein at least the first indexing is one or more of the following: a primary index, a join index, a secondary index, a non-unique primary index.

19. The computing system of claim 16, wherein the table is arranged by a no-primary index table.

20. The computing system of claim 16, wherein at least the first indexing is at least partly based on a secondary index.

* * * * *